United States Patent [19]

Tall

[11] 4,029,250

[45] June 14, 1977

[54] PHOTOGRAPHIC STRIP TRANSPORT INTERVAL CONTROL

[75] Inventor: Leonard H. Tall, Mercer Island, Wash.

[73] Assignee: CX Corporation, Seattle, Wash.

[22] Filed: Sept. 23, 1975

[21] Appl. No.: 616,017

[52] U.S. Cl. .............................. 226/136; 226/141
[51] Int. Cl.² ........................................ B65H 17/26
[58] Field of Search .......... 226/134, 136, 137, 138, 226/139, 141

[56] References Cited

UNITED STATES PATENTS

| | | | |
|---|---|---|---|
| 3,166,225 | 1/1965 | Sirugue | 226/141 X |
| 3,315,862 | 4/1967 | Schwardt | 226/136 |
| 3,656,673 | 4/1972 | Erickson | 226/136 X |
| 3,887,122 | 6/1975 | Sommeria | 226/136 |

*Primary Examiner*—Richard A. Schacher
*Attorney, Agent, or Firm*—Christensen, O'Connor, Garrison & Havelka

[57] ABSTRACT

Stepwise feed apparatus for longitudinal advancement of photographic print or film strips to an operating device, such as a cutter. Control of step feed distance is provided by a digital command derived by selective positioning of a movable cursor relative to the operating device, the cursor being set visually so as to coincide with a selected operating point along the strip. The command distance may be corrected at will either with the strip at rest or when in motion to accommodate changes in the interval between operating points along the strip.

5 Claims, 3 Drawing Figures

PHOTOGRAPHIC STRIP TRANSPORT INTERVAL CONTROL

BACKGROUND OF INVENTION

This invention relates to improvements in devices for rapid stepwise transport of photographic film strips and photographic print strips and the like, such as in a commercial processing laboratory wherein the strips are fed to a strip cutter or other operating device cyclically actuated in timed relation to the pauses between progressive feed increments. A broad object hereof is to provide digital precision means under direct operator control to establish and, as necessary, correct the successive transport step distances or intervals by which the drive mechanism advances the strip to the cutter or other operating device so as to present precisely the correct operating point on the strip each time to the operating device. A related object is to make such corrections with little if any interruption of the strip transport operation. The invention is herein illustratively described by reference to the presently preferred embodiment thereof; however, it will be recognized that certain modifications and changes with respect to details may be made and that certain other applications of the invention are contemplated without departing from the essential features involved.

It was known in the art heretofore to utilize rapid-acting strip feed or transport devices responsive to a digital command number to establish the desired incremental feed distance. Such feed mechanisms employed precision increment stepping motors and step counters tht stopped the motor when the count reached the command value. Detection of a notch (or other mark) in the advancing strip at a detection point ahead of the operating device provided a basis to compute feed distance to the latter and thus provided the required digital command. However, for those occasions in which filmstrip or photographic print strip is not notched or otherwise marked, other means are necessary to command the drive mechanism if the important advantages of that type of rapid transport system are to be retained.

A further object hereof is to provide a simple and reliable means allowing precision corrections to be made at will in the step feed distance of the feed means through visual observation and control of a single manually adjustable indicator element. A related object is to permit making such corrective adjustments very quickly either with the strip at rest or "on the fly," that is, while under stepwise advancement by the feed mechanism. In either event adjustments are made without materially delaying or retarding system operation.

Still other objects include devising a relatively low-cost and reliable apparatus readily adaptable to existing equipment, devoid of mechanical parts subject to wear and consequent maintenance requirements, and readily implemented using components already available or easily produced.

BRIEF DESCRIPTION OF INVENTION

In accordance with this invention means are provided for deriving a step feed distance digital command signal by the simple act of selectively positioning a visible cursor or other indicator element into coincidence with a desired operating point on the advancing photographic strip and utilizing this signal to control the feed step distance by which the strip is repeatedly advanced. Typically this operating point will be in the gap between successive exposure frames on a print or film strip, representing for instance the intended line of severance by a cutter. In some cases the feed step distance between stopping points at which the cutter operates will be the frame interval itself. In other cases it may equal three or four frame intervals. In either situation drift or changes can occur in the interval spacings on a strip due to variations incurred in prior processing operations. Corrections in the feed intervals are thus required. The commanded step feed distance remains constant on repeating feed cycles unless and until the operator interrupts the operation momentarily for adjustive resetting of the cursor. This will only be necessary if the photographic frame internal spacings on the strip undergo an indicated shift or relocation in portions of the strip approaching the operating device. Alternatively, the operator may make one or more slight adjustments of the cursor on the fly, that is with filmstrip stepwise feed motion uninterrupted. This he can readily learn to do through skillful "tapping" of the selective positioning knob or other control element used to vary the value of the distance command signal, based on close and continuous observation of the location of the severance lines relative to the several frames or frame groups.

These and other features, objects and advantages of the invention will become more fully evident as the description proceeds by reference to the accompanying drawings illustrating a typical application of the invention in photographic processing and a specific means for deriving the digital command signal as disclosed and claimed in the co-pending application of Gerald L. Edwards filed Sept. 22, 1975, Ser. No. 615,387 entitled "Propagative Wave Energy Locating Apparatus"

DESCRIPTION REFERENCED TO DRAWINGS

Figure 1:
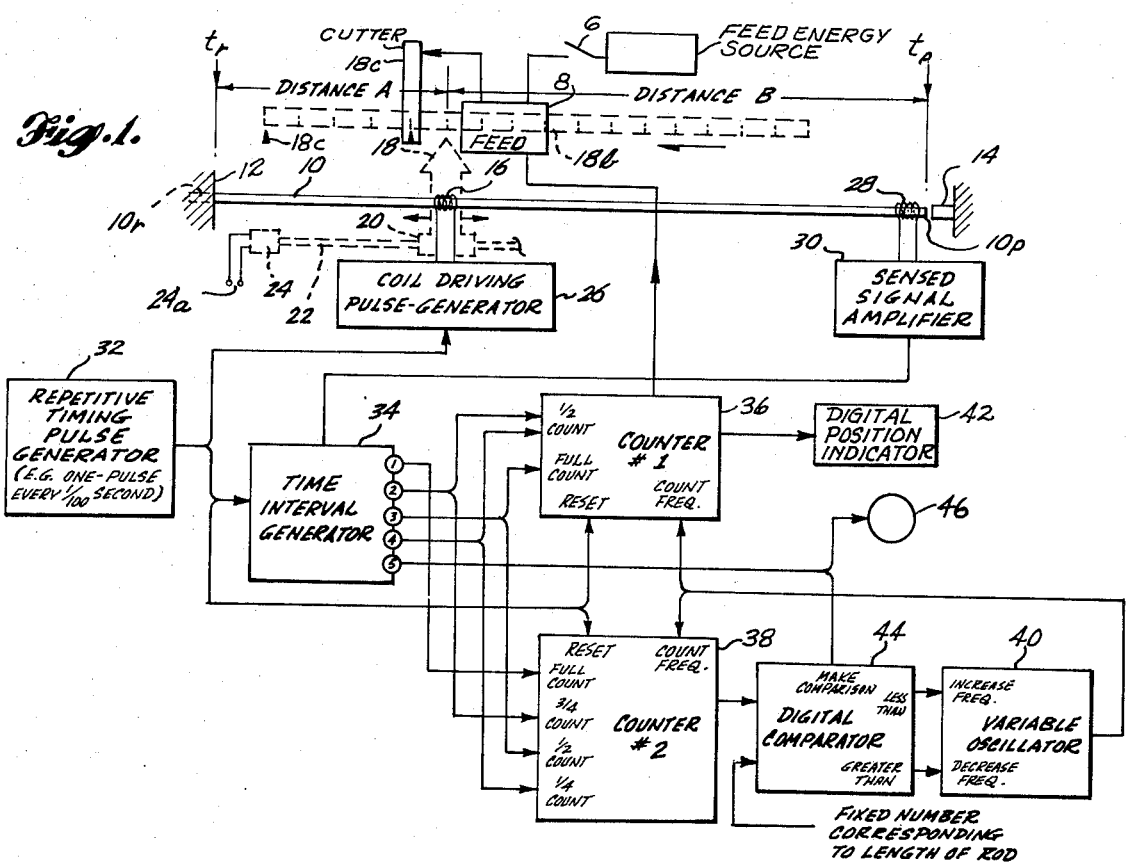
FIG. 1 is a schematic diagram illustrating the presently preferred embodiment of the invention.

Referring to the drawings, the desired digital command signal for application to the stepwise feed means 8 is derived by setting manually and measuring electronically the location of a movable indicator element or cursor 18 along the feed path of strip 18b. Such measurement means in the illustrated embodiment employs an elongated magnetostrictive rod 10 and operates by periodic impulse energization of coil 16 mounted on cursor element 18 for inducing a brief local compressional shock in the magnetostrictive rod 10. The stock wave propagates bi-directionally from the coil. Transducer 28 fixed in position closely adjacent one end of rod 10 senses first the direct shock wave and thereafter the indirect shock wave, i.e. that reflected from the opposite end of the rod. By processing these first two sensed shock signals sensed by transducer coil 28 and digitally measuring certain time intervals associated with their occurrences and their relationship in time to the original shock excitation of the rod in cyclical manner a continuing accurate determination is established and/or indicated of the exact location of element 18 along the rod 10. Thus the act of setting a movable cursor 18 and thereby the excitation transducer, at the desired cutting location along the strip ahead of the cutter 18c causes the apparatus to produce a digital output from counter 36 that may be fed to the digitally controlled, self-recycling stepwise feed mechanism 8 so as to advance the strip by precisely the measured distance each time before the cutter operates. The distance command signal cyclically impressed on feed means 8 is treated by the latter as a constant step feed distance command until cursor 18 is repositioned along the strip 18b. Thence until operating switch 6 is released, opening the energizing circuit to the stepwise feed means 8, the latter continues to recycle itself, each time advancing strip 18b by the command distance, and stopping momentarily while triggering cutter 18c.

The wave propagative member is in the form of an elongated magnetostrictive rod 10 and the form of propagational wave energy used in the system is a direct impulse of compressional wave energy. The rod is preferably of uniform cross section throughout its length and has a free end 10p at which incident propagative wave energy is substantially fully reflected. With this end terminating in open air, the reflection occurs with phase reversal of the energy wave or impulse. The rod's opposite end 10r is restrained or held against vibration such that substantially all propagative wave energy incident thereon is reflected without phase reversal.

Physical support mounts for the rod are not illustrated in the drawings. They may be of any conventional or suitable design permitting compressionable wave energy propagation longitudinally of the rod with minimal or no reflections occurring from the rod's support mounts. Rod shape in cross section may vary according to specific design requirements or preference, a round cross section being most convenient.

The restrained or clamped end 10r of the rod is shown schematically as being embedded in a rigid body 12, the effective end of the rod thus becoming the junction plane $t_r$ between the rod and the body 12. The body 12 is theoretically a nonabsorptive mass causing complete reflectance of incident energy with essentially zero change of phase of the reflected energy. It will be recognized as a practical matter that some (minor) absorption of incident energy in the body 12 will occur and is permitted. The sensed signal amplifier 30 receiving composite response signals from sensing coil transducer 28 has a minimum acceptance threshold that is exceeded by the primary (i.e., first occurrence and first reflection) signals, but not by sporadic signal components nor by multiple (i.e. subsequent) reflection signals resulting from the primary shock energy impulses still propagating in the rod after the succeeding operating cycle starts. Those occurring in the first or original operating cycle are ignored by the logic program circuit in any case.

A magnetizing or driving coil 16, preferably of short helically wound form closely encircles magnetostrictive rod 10. This coil is connected to be impulse-energized by a discrete repeating direct current impulse from coil-driving pulse generator 26. The latter is periodically triggered by a repetitive timing pulse generator 32 operating at a suitable recurrence frequency, for example at 100 cycles per second. With each such brief impulse of current flowing in coil 16, a symmetrical pattern of magnetic flux is excited in the rod 10 concentrated essentially in a discrete or localized region centered in the coil 16. Due to the magnetostrictive properties of the rod material, the resultant brief magnetizing shock localized in the rod at the precise location of coil 16 produces a corresponding compressive stress shock in the rod that starts propagating simultaneously in both directions along the rod, that is toward both ends of the rod.

The duration of this compressional wave energy shock initially excited in the rod is brief (i.e., a very small fraction, such as one-hundredth, or less), the propagation time of the shock wave from end to end of the rod. It should also represent a small fraction the propagating time to either end of the rod in all adjustive positions of the coil 16. An elongated helical feed screw 22 paralleling the rod 10 and extending over most of its length engages a carrier nut 20 carrying cursor element 18 and thereby transducer coil 16. The positioning screw 22 is turned in one direction or the other by an element 24 such as a hand knob or a reversible-geared electric motor drive unit 24 having electrical input terminals 24a. For example, in photoprint cutting the counter output digital value representing cursor position established by turning of screw 22 then automatically programs the metered feed device 8 to advance the photoprint strip 18b by that precise distance which places the indicated point on strip 18b in operating position beneath the cutter 18c so as to assure correctly severing the print.

Functioning in association with the magnetizing or driving coil 16 is a sensing coil 28 located closely adjacent the free or unrestrained end 10p of the magnetostrictive rod. Coil 28 is preferably similar to coil 16 both in form and in its magnetically coupled relationship to rod 10, although its position is fixed in predetermined adjacent relationship to the rod's free end. Magnetic bias flux axially oriented in the rod and linking the coil 28, is produced in the rod's free end $10_p$ by a bias magnet 14 stationarily mounted adjacent such end. Thus, whenever a compressional wave shock wave reaches the rod's end $10_p$ and thereby traverses the coil 28, it varies the magnetic permeability, hence the bias flux linked with sensing coil 28, due to the rod's magnetostrictive properties. This attendant change in magnetic flux density linking coil 28 induces a response in the form of a voltage impulse in coil 28 proportional to the rate of flux change. The resultant voltage signal is applied to sensed signal amplifier 30.

Amplifier 30 is designed, using well-known principles, with a minimum or threshold response level such that spurious and low-level signals are ignored or rejected by amplifier 30. While the interval between pulses from generator 32 can be set long enough to stop ringing in the rod after one measurement cycle before the next one is started, the threshold input level of amplifier 30 will permit use of a shorter interval without intercycle interference. Those primary signals from coil 28 to which the amplifier 30 does respond are squared or clipped as a result of the threshold input level, the high gain and the relatively low saturation level of the amplifier. Thus, amplifier 30 produces a discrete flat-topped or squared wave output signal with each desired shock wave response impulse produced by sensing coil 28. As will be more fully explained hereinafter, the first two such squared waves produced by amplifier 30 following each of the repeating shock excitations of rod 10 by driving coil 16 are used in the location measurement logic. The first of these squared waves results from the shock wave propagating from sensing coil 16 directly to the rod's end $10_p$. The second is the indirect shock wave which arrives at the rod's end $10_p$ after having travelled first from the driving coil 16 to the opposite end $10_r$ where it is reflected (without phase change or reversal) for travel the full length of the rod 10 to the end $10_p$. The logic program ignores any subsequent responses in the same cycles from amplifier 30. By appropriate processing and time interval measurements based on the occurrences of each of these repeating sets of the first two (direct and indirect) shock wave signals in each cycle, extremely accurate digital measurement or determination of position of element 18 is obtained.

Furthermore, by additional time interval measurements and a reference comparison relating these shock wave signals to each other and to time of excitation of coil 16, the system is self-correcting for the magnetostrictive rod's changes in shock wave propagation velocity due, for example, to changes in ambient temperature otherwise affecting accuracy of the position determination function.

The logic programmed squared wave signal processing and time determining functions and circuits will now be described with reference to the drawings including a schmetic diagram and timing diagrams. Circuit details are omjitted because they are or may be of conventional or well-known design and thus in themselves form no part of the invention. Nor is their verbal description herein considered necessary in order for a person or ordinary skill in the art of digital and timing circuit technology to understand the invention.

Figure 2:
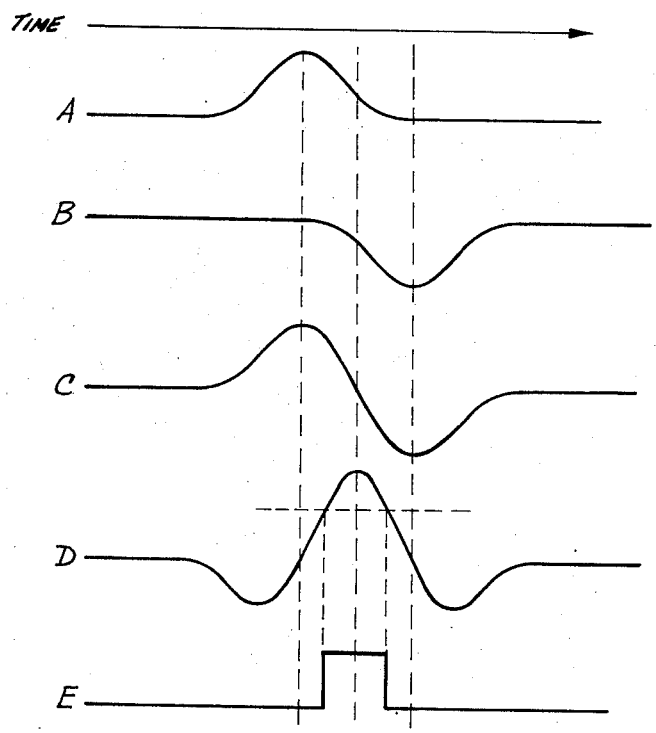
FIG. 2 is a wave diagram illustrating operation of the sensing transducer device used in deriving the digital command signals.
Figure 3:
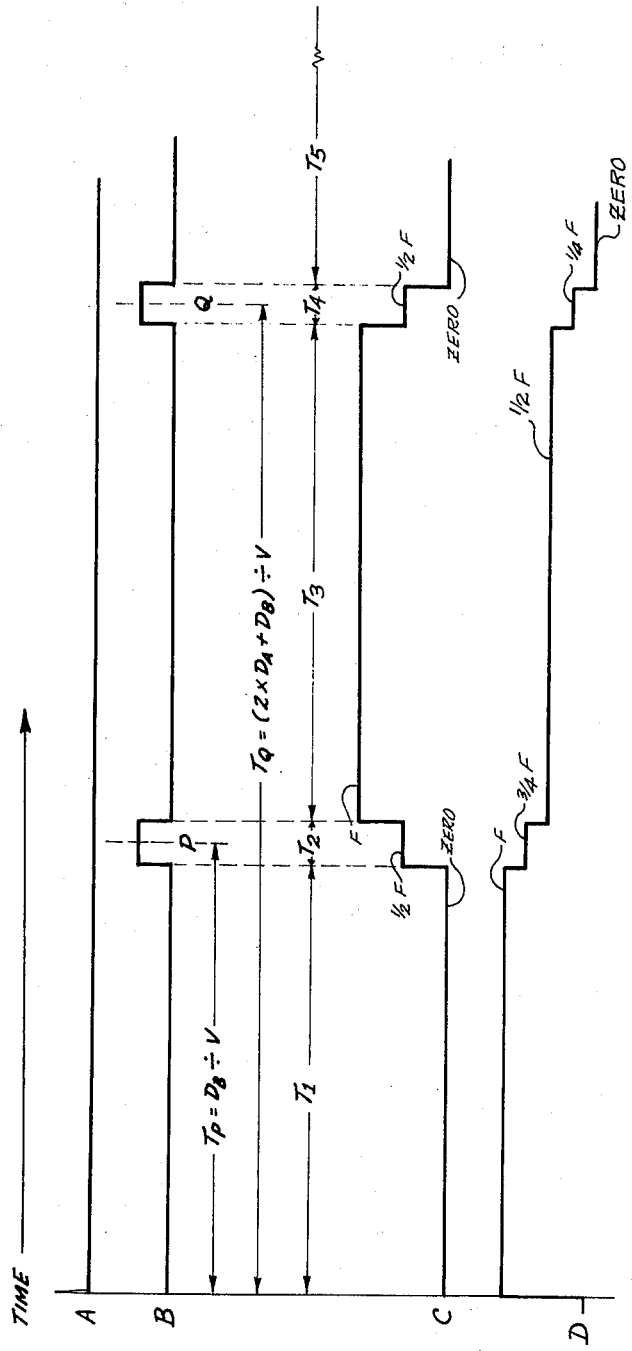
FIG. 3 is a timing diagram illustrating operation of the digital command signal derivation apparatus by which the invention is implemented in this embodiment.

The timing diagram (FIG. 3) and governing logic equations that follow herein can best be understood by first describing, in reference to FIG. 2, the nature and function of the sensing transducer coil 28 as a means to produce out of amplifier 30 a squared wave signal of certain propagation time-related characteristics referenced to the effective adjacent end point of magnetostrictive rod 10. FIG. 2A shows the magnetic flux change in coil 28 as an incident shock wave impulse is first traversing the coil. FIG. 2B shows in time relation to FIG. 2A the magnetic flux change in coil 28 as that same incident shock wave is again traversing coil 28 upon reflection from the rod's end face or plane $t_p$. It will be seen that the two overlap in time, and that when the spacing between the coil's center (longitudinally of the rod) and the rod's end plane $t_p$ is optimum the composite magentic flux change affecting the coil is as shown in FIG. 2C wherein the flux changing downslope of the first merges smoothly with the flux changing downslope of the second. The composite or additive effect on transducer induced voltage is shown in FIG. 2D wherein it will be seen that a single smoothly peaked composite voltage impulse results in the coil 28. Applied to the amplifier 30, the repsonse signal produces a squared wave as shown in FIG. 2E of shorter duration than the positive excursion signal in FIG. 2D, due to the threshold minimum of amplifier 30, it is steep-sided and clipped or flattened, due to the amplifier's high gain and saturation level characteristics. It will be of importance to note that the duration of the squared wave in FIG. 2E is not critical to system performance (nor is that of the initial shock excitation itself), nor is the precise location of the coil 28 in reltion to the end plane $t_p$ of rod 10. Although the shape of the composite response effect shown in FIG. 2D will vary somewhat with deviations in position of coil 28 from the optimum, this will not effect the squared wave's center point or form. That center point will continue to coincide substantially with the instant the incident propagating wave peak center arrives at the end plane $t_p$. Thus, there is afforded both a noncritical termination arrangement for rod 10 and a noncritical positioning and design arrangement for a time-position precise sensing transducer capable of detecting, without interfering with, propagating wave incidence upon the end of an interval measuring propagative wave energy member.

In FIG. 3A a trigger pulse is shown on a time scale from repetitive timing pulse generator 32. This starts the measurement cycle. It triggers coil-driving pulse generator 26, starts an operating cycle of an event sequence time interval generator 34 and resets to zero a firs digital counter 36 and a second digital counter 38. Each of the latter is receptively connected to a variable (controlled) frequency count pulse generator or variable oscillator 40. As will be explained more fully, the latter's frequency is subject to controlled variation automatically by features of the system in order to compensate for or eliminate the effects of ambient temperature or other disturbances affecting the characteristics, hence the accuracy, of rod 10 as a precision measurement element. Using conventional logic system technology, counter 36 operates a digital position indicator 42 which provides a new and continuing digital base reading of the total cycle count from counter 36 representing position of element 18 at the end of the measurement phase of each operating cycle started by the trigger from generator 32.

In FIG. 3B the two squared waves produced by amplifier 30 appear in time sequence as they occur after each shock excitation of the rod 10 produced by triggering of generator 26. The first of these of a duration $T_2$, has its inception at the end of interval $T_1$, and its center point P (timewise) at the end of interval $T_P = D_B \div V$ (Equation 1), where $D_B$ is the effective distance from the center of transducer 16 to the rod's end plane $t_p$ (FIG. 1) and where V is the shock wave propagation velocity in rod 10. The second the these squared waves, of a duration $T_4$, has its inception at the end of interval $T_3$ which starts at the termination of interval $T_2$, and its center point Q (timewise) at the end of interval $T_Q = (2DA + DB) \div V$ (Equation 2), where DA is the effective distance from the center of transducer 16 to the rod's opposite end plane $t_r$ (FIG. 1). The time interval $T_5$ partially shown in FIG. 3B is the time remaining to the next succeeding cycle trigger pulse similar to that shown in FIG. 3A.

In the following additional numbered equations describing the logic system used in converting interval measurements into a digital indication of position of element 18, F represents the count frequency of source 40.

$$T_p = T_1 + \tfrac{1}{2}T_2 \qquad \text{Eq. 3}$$

$$T_q = T_1 + T_2 + T_3 + \tfrac{1}{2}T_4 \qquad \text{Eq. 4}$$

By subtracting Equation 1 from Equation 2, $$T_q - T_p = 2D_A \div V \qquad \text{Eq. 5.}$$

By halving the sum of Equations 1 and 2, $$\tfrac{1}{2}(T_P + T_Q) = (D_A + D_B) \div V \qquad \text{Eq. 6}$$

By substituting Equations 3 and 4 into Equation 5, one derives:

$$\tfrac{1}{2}T_2 + T_3 + \tfrac{1}{2}T_4 = 2D_A \div V \qquad \text{Eq. 7}$$

In terms of digital counts tallied by counter 36 at frequency F, Equation 7 represents the final count representing location of the element 18 along rod 10, thus:

$$\tfrac{1}{2}T_2F + T_3F + \tfrac{1}{2}T_4F = 2D_A(F \div V) \qquad \text{Eq. 8}$$

Time interval generator 34, is in essence a sequencing program controller that, with couner 36 and source 40, implements the logic cycle of Equation 8 in response to each trigger from timing generator 26 and the ensuing two squared wave signals received from amplifier 30. Referring to Equation 8, during interval $T_2$, the time interval generator 34 through its output No. 2 conditions counter 36 to count at half rate, that is to count every other pulse dlivered by oscillator 40 at frequency F. During interval $T_3$ counter 36 is caused by generator 34 through its output No. 3 to count at full rate; whereas during inerval $T_4$, it counts again at half rate under control of the generator 34, output No. 4. The resultant total count accumulated in counter 36 and automatically fed into the digital indicator 42 at the end of $T_4$ is thus precisely proportional to the distance $D_A$ of element 18 from the end plane $t_r$ of propagative rod member 10. In this regard it will be noted from logic Equation 8 and FIG. 3 that the counting at half rate during the intra-pulse intervals $T_2$ and $T_4$ inherently accounts for the fact that the propagating wave energy pulses begin in sensing coil 28 a certain time before and persist a certain time after arrival of the maximum component at the end plane $t_p$ of rod 10, and since these times are essentially equal, the effective arrival times of the pulse peaks are determined when the accumulating counts at half rate during $T_2$ and $T_4$ represent half the pulse duration times. The digital measurement of time (and distance) is thus made to the precise pulse center points (P and Q in FIG. 3B) as desired in order to provide the measurement in relation to the exact ends $t_r$ and $t_p$ of rod 10.

In order to maintain a continuous compensating correction for any changes in the length of or propagation velocity in rod 10, counter 38 in association with programming generator 34 and controllable count frequency generator 40 provides a total length count corresponding to wave energy propagation time from end to end of rod 10. This it does by implementing the following logic equation derived by substituting above Equations 3 and 4 in Equation 6:

$$T_1 + \tfrac{3}{4}T_2 + \tfrac{1}{2}T_3 + \tfrac{1}{4}T_4 = (D_A + D_B) \div V \qquad \text{Eq. 9}$$

multiplied by count frequency F yields:

$$T_1F + \tfrac{3}{4}T_2F + \tfrac{1}{2}T_3F + \tfrac{1}{4}T_4F = (D_A + D_B)F \div V \qquad \text{Eq. 10}$$

Through control provided by sequentially acting terminals Nos. 1, 2, 3 and 4 of program sequence generator 34, the second counter 38 is caused to count successively at full rate during $T_1$, three-fourths rate during $T_2$, half rate during $T_3$ and one-fourth rate during $T_4$. Through this control logic, the total count tallied to the end of $T_4$ is proportional to the total effective rod length $D_A + D_B$. Then by making a digital comparison between this tally and a fixed (i.e., constant) reference count (corresponding to normal ambient rod length) both fed into comparator 44, using coventional techniques, an error or correction signal proportional to the instantaneous (one cycle determined) difference yields either a "less than" or "more than" correction signal applied to variable timing pulse oscillator 40 so as to incrementally increase or decrease its frequency F. An appropriate increase in such frequency offsets or compensates for an increase in rod shock wave propagation velocity, for example, and vice-versa. Such a correction made in each cycle of timing generator 32 thereby assures that the actual physical distance $D_A$ between fixed end plane $t_r$ and the existing location of element 18 is accurately measured in the reading of indicator 42. A metering device 46 may be added responsive to the circuit program signal from the generator's terminal No. 5 to show that the latter is functioning and that the count presented by indicator 42 is valid.

It will thus be evident that the system provides an accurate digital distance command to feed means 8 corresponding to the position of movable cursor element 18 in relation to cutter 18c. When during the stepwise alternate incremental advancement and stopping of the filmstrip effected by feed means 8, it appears to the operator that the filmstrip is not stopping in correct position for cutting, element 24 may be selectively operated to adjust the cursor 18 one way or the other to increase or decrease the feed stroke of means 8. The operator can make this adjustment with the mechanism stopped altogether by opening the switch 6 with a feed stroke completed and the cursor 18 then set on the desired cutting line on the strip 18b. Alternatively the operator can observe from the severed lengths of strip whether the feed stroke produced by feed means 8 is too short or too long and make an adjustment of member 18 with the feed means operating. It will be appreciated that other forms of movable element distance measuring devices to derive command signals for the feed means may be used in lieu of that described, and that the invention is also applicable to other operating devices such as printers, notchers, markers, etc. These and other aspects of the invention including varying embodiments and equivalents to the novel features thereof and combinations as hereinafter claimed will be evident to those of ordinary skill in the relevant art.

What is claimed is:

1. Apparatus for processing of photographic strips and the like including an intermittently activatable operating device stationed along a feed path of longitudinal advancement of the strip, stepwise feed means responsive to an electrical command signal and operable to advance the strip by a plurality of successive fixed increments totalling a predetermined feed distance between successive actuations of said operating device, the number of such increments and thereby said feed distance being determined by a digital count command signal applied to said feed means, a movable indication element positioned along said feed path in advance of said operating device and selectively adjustable at will along said strip into selected positional relationship with a desired operative point on the strip, thereby to selectively vary the distance between such element and said operating device, distance measurement means operatively associated with such movable element for deriving an electrical command signal in the form of a digital count corresponding in value to said distance, and means applying said derived command signal to said feed means to control the number of fixed increments produced thereby corresponding to said digital count between successive actuations of said operating device.

2. The apparatus defined in claim 1 wherein the feed means comprises a self-recycled stepwise feed means operable to advance the strip by steps to a succession of stopping positions and includes means actuating the operating device in timed relation to stopping of the strip.

3. The apparatus defined in claim 2, wherein the step feed means includes control means operable for interrupting its operation at will to permit selective positioning of said indication element with the strip at rest in any of said stopping positions.

4. The apparatus defined in claim 3 wherein the indicator element is adapted for selective adjustment also while the strip is undergoing advancement by the feed means.

5. The apparatus defined in claim 2 wherein the indicator element is adapted for selective adjustment also while the strip is undergoing advancement by the feed means.

* * * * *